Nov. 26, 1968  R. S. BAKER  3,413,504
ELECTROMAGNETIC PUMP HAVING AN IMPROVED HELICAL ROTOR

Filed Feb. 1, 1966

INVENTOR.
RICHARD S. BAKER
BY
Donald J. Ellingsberg

Nov. 26, 1968   R. S. BAKER   3,413,504
ELECTROMAGNETIC PUMP HAVING AN IMPROVED HELICAL ROTOR
Filed Feb. 1, 1966   2 Sheets-Sheet 2
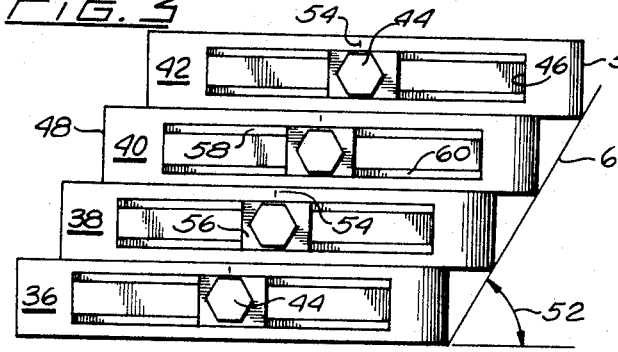
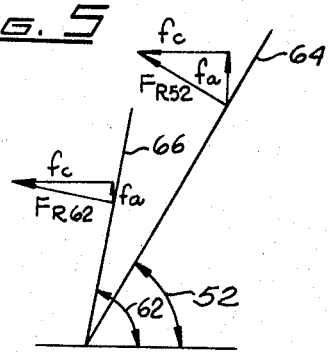
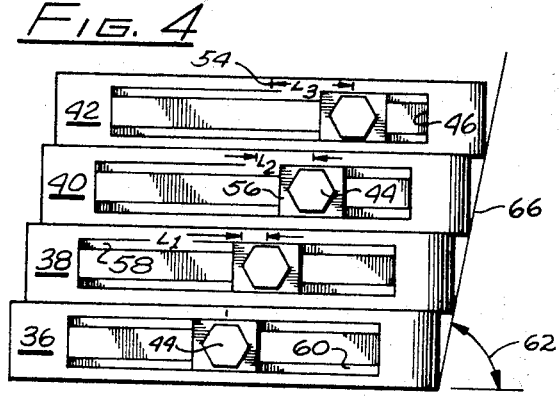
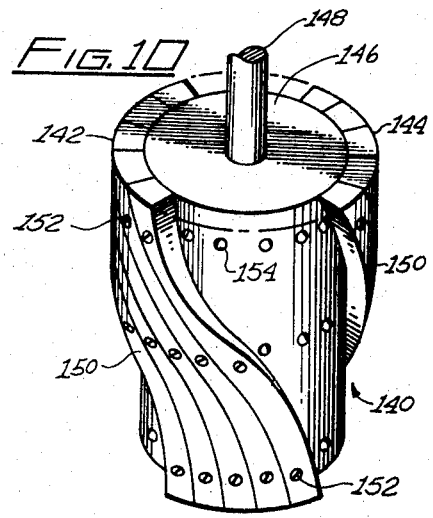
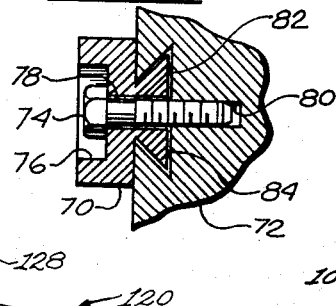
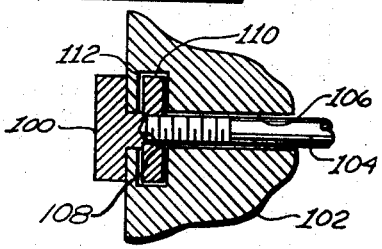
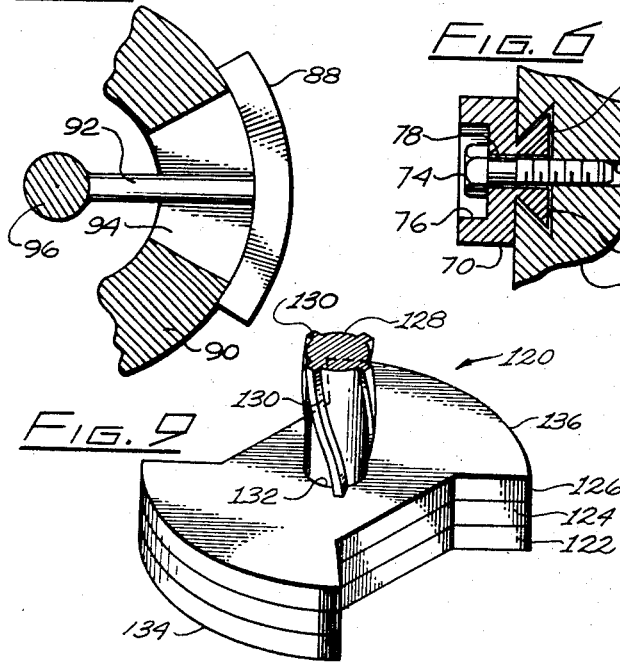
INVENTOR.
RICHARD S. BAKER
BY
Donald J. Ellingsberg

United States Patent Office 3,413,504
Patented Nov. 26, 1968

3,413,504
ELECTROMAGNETIC PUMP HAVING AN IMPROVED HELICAL ROTOR
Richard S. Baker, Northridge, Calif., assignor to North American Rockwell Corporation, a corporation of Delaware
Filed Feb. 1, 1966, Ser. No. 524,161
10 Claims. (Cl. 310—269)

This invention relates to an electromagnetic pump and more particularly to a helical rotor electromagnetic pump having an improved helical rotor. The invention is based upon the principle of operation of my helical rotor electromagnetic pump as disclosed in U.S. Patent No. 2,940,393, issued June 14, 1960, and assigned to the same assignee as the present invention.

Electromagnetic pumps convert magnetic energy into pressure energy in an electrically conductive fluid through the interaction of an electric current and a transverse magnetic flux field, and thereby move the fluid in a desired direction. The electric current, the magnetic field, and the direction of fluid movement are orthogonal in accordance with the established principles of electrophysics.

Helical rotor electromagnetic pumps use the same principles of electrophysics but differ from conventional electromagnetic pumps by helically advancing the magnetic flux field through the electrically conductive fluid. The helically advancing magnetic field induces electrical eddy currents in the fluid. Because the source of magnetic flux has a helical geometry, the eddy currents flow in patterns that conform with the helical source of magnetic flux and interact with the advancing magnetic field. This interaction develops a pumping force that moves the fluid through a suitable pump region.

In one form of helical rotor electromagnetic pump, the source of magnetic flux is a helical rotor with field coil windings. The helical rotor has magnetic pole surfaces that are skewed circumferentially while traversing the axial length of the rotor. When the helical rotor is developed, i.e., rolled out onto a plane surface, the perimeter of the rotor base describes a base line and the edges of the skewed pole surfaces describe parallel, straight lines inclined to the base line at an angle called the "helix angle."

The helix angle determines the orientation of a resultant $F_R$ which represents the pumping force developed by the helical rotor electromagnetic pump. Vector $F_R$ is oriented in a direction generally perpendicular to the edge of a pole surface, and is the resultant vector of an axial force $f_a$ and a circumferential force $f_c$. Axial force $f_a$ is oriented in a direction generally perpendicular to the base line and circumferential force $f_c$ is oriented in a direction generally parallel with the base line. Thus, it is the axial force $f_a$ that moves the fluid axially through the pump region at a desired fluid velocity. Changing the helix angle, therefore, alters the orientation of vector $F_R$ and increases or decreases the value of axial vector $f_a$ which also increases or decreases the pumping force imparted to the fluid in the pump region.

The helix angle in known helical rotor electromagnetic pumps can not be changed when a pump is in an operating location except by the substitution of one rotor for another rotor that has the desired helix angle. It is therefore desirable with prior art helical rotor electromagnetic pumps to have several helical rotors available, each having a different helix angle. This is an undesirable expense.

Accordingly, it is an obect of the invention to provide a new and improved helical rotor for a helical rotor electromagnetic pump.

Another object of the invention is to provide a new and improved helical rotor having a variable helix angle.

A further object of the invention is to provide a new and improved helical rotor having adjustable magnetic pole surfaces.

Briefly, in accordance with the invention, an improved helical rotor is provided for a helical rotor electromagnetic pump in which the rotor has a plurality of adjustable rotor pole shoes that develop at least first and second rotor pole surfaces which define a variable helix angle. An adjustable means cooperates with the rotor pole shoes so that the adjustment of selected ones of the pole shoes changes the position of the rotor pole surfaces and thereby defines a predetermined helix angle.

Further objects, features and the attending advantages of the invention will become apparent when the following description is read in view of the accompanying drawings in which:

FIGURE 3 is an enlarged plan view of a portion of the improved helical rotor of FIGURE 2 adjusted to a first helix angle;

FIGURE 4 is an enlarged plan view of the portion of the improved helical rotor of FIGURE 3 adjusted to a second helix angle;

FIGURE 5 is a graphical representation of the first and second helix angles of FIGURES 3 and 4, respectively;

FIGURE 6 is a sectional view, partly broken away, of a portion of another form of improved helical rotor;

FIGURE 7 is a sectional view, partly broken away, of a portion of another form of helical rotor;

FIGURE 8 is a sectional view, partly broken away, of a portion of another form of improved helical rotor;

FIGURE 9 is a perspective view of a portion of another form of improved helical rotor; and FIGURE 10 is a perspective view of another form of improved helical rotor.

Figure 1:
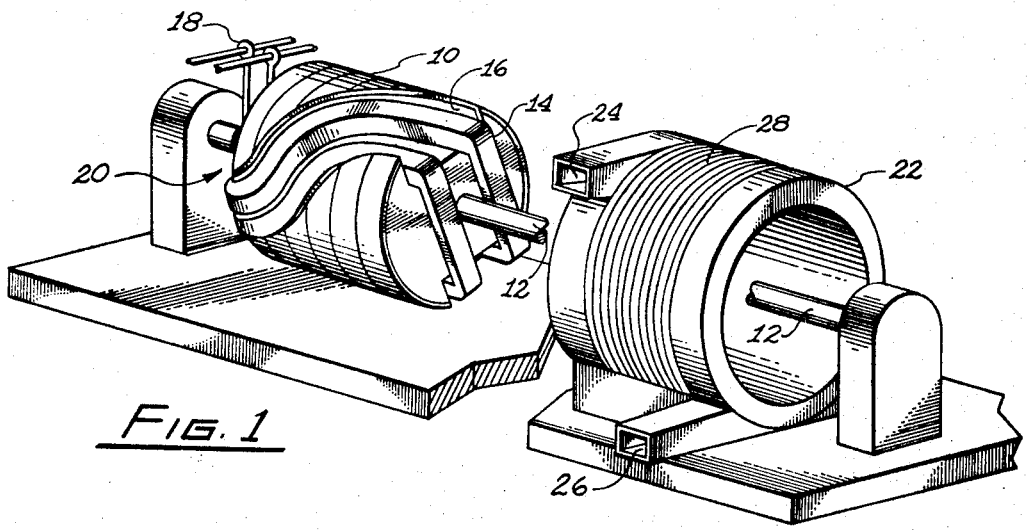
FIGURE 1 is an exploded perspective view of a helical rotor electromagnetic pump having one form of an improved helical rotor.

Referring to FIGURE 1, a helical rotor electromagnetic pump is shown such as disclosed in U.S. Patent No. 3,187,672, issued June 8, 1965. The pump has one form of improved helical rotor 10 secured to or integrally formed with a rotor shaft 12 and driven by a suitable prime mover (not shown). A field coil winding 14, consisting of one or more coils or conductors, is wound in the root of a helical thread 16 on the rotor 10. The field winding 14 is electrically connected to an external source of power at 18 through suitable brushes, leads and slip rings generally indicated at 20—all conventional. The field winding 14 is connected so that adjacent electromagnetic field poles or rotor pole surfaces of the helical rotor 10 produce magnetic poles of opposite polarity that set up a magnetic flux field about the helical rotor 10 that conforms with the helical geometry of the rotor.

The helical rotor 10 cooperates with a pump region or annulus 22 that is juxtaposed between and in fluid communication with an inlet region 24 and an outlet region 26. A magnetic flux return member 28 is arranged circumjacent to the pump region 22 and provides a flux return path for the magnetic flux field set up by the helical rotor 10. The magnetic flux return member 28 is preferably built-up from a plurality of laminations formed from a good grade of magnetic material such as silicon steel.

Figure 2:
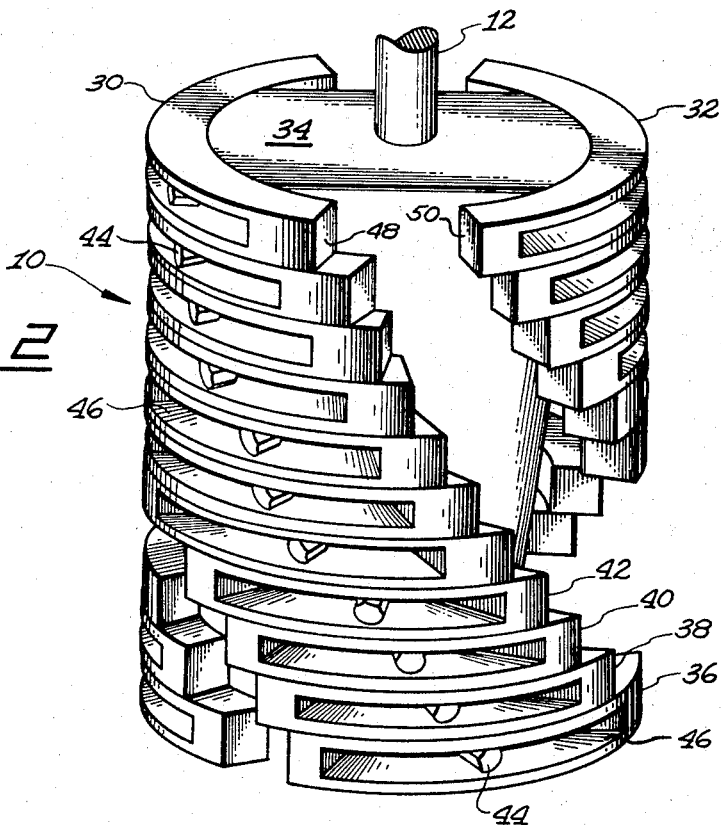
FIGURE 2 is an enlarged perspective view of the improved helical rotor of FIGURE 1.

Referring now to FIGURE 2, the helical rotor 10 in the embodiment shown is a salient pole rotor having the form of a two-pole helical rotor with rotor pole surfaces 30 and 32; however, the helical rotor 10 can also have a cruciform or any suitable multipolar form. Helical rotor 10 has a core or rotor body member 34 secured to or integrally formed with the rotor shaft 12. Both rotor shaft 12 and the rotor body member 34 are preferably formed from a magnetic material such as mild carbon steel. The rotor body member 34 is suitably formed into a twisted or warped geometry. It is contemplated that the rotor body member 34 can have other geometric shapes, e.g. a right cylinder as is described hereinafter.

A plurality of similar rotor pole shoes, such as rotor pole shoes 36, 38, 40, and 42, are juxtaposed in axial alignment and are attached to the rotor body member 34 of the helical rotor 10 by a fastening means, such as similar cap screws 44 that pass through similar rotor pole shoe slots 46 into tapped holes (not shown) in the rotor body member. The rotor pole surfaces 30 and 32 of the helical rotor 10 are developed by the plurality of stacked rotor pole shoes. The ends, for example, ends 48 and 50, of the circumferentially spaced-apart rotor pole shoes generally define a helical thread, such as thread 16 as shown by FIGURE 1. Since the rotor pole shoes are circumferentially adjustable for a limited arcuate distance dependent upon the length of the rotor pole shoe slots 46, the helical thread—and thus the corresponding helix angle that is also defined by the rotor pole shoe ends—is variable.

Referring now to FIGURES 3 and 4, the operation of the improved helical rotor of the present invention will be described using, for example, rotor pole shoes 36, 38, 40 and 42 of rotor 10 as shown by FIGURE 2.

In FIGURE 3, the rotor pole shoes 36, 38, 40 and 42 are juxtaposed and axially aligned. The rotor pole shoes are adjusted so that the ends 48 and 50 of each of the pole shoes generally define a first helix angle 52. The rotor pole shoes are shown, for purposes of description, circumferentially adjusted so that the cap screw 44 for each shoe is centrally positioned in the rotor pole shoe slot 46. This central position may be noted by suitable indicia, such as similar center marks 54. Cap screws 44 pass through similar washers 56 which bear upon recessed lip edges 58 and 60 in each of the rotor pole shoes as shown. It is contemplated that the washers 56 can be eliminated with the use of suitably sized cap screws.

In FIGURE 4, the rotor pole shoes 38, 40 and 42 have been circumferentially adjusted for a predetermined arcuate distance as indicated by distances $L_1$, $L_2$ and $L_3$, respectively. This circumferential adjustment is accomplished by loosening the cap screws 44 and moving the selected ones of the rotor pole shoes, i.e. shoes 38, 40 and 42, the predetermined distances. A desired helix angle 62 is now defined by the ends of the rotor pole shoes 36, 38, 40 and 42. Cap screws 44 are again tightened to secure the rotor pole shoes against further circumferential movement, particularly during operation of an electromagnetic pump using the improved helical rotor.

Referring now to FIGURE 5, the relationship between helix angle 52 (from FIGURE 3) and helix angle 62 (from FIGURE 4) is graphically shown. Helix angle 52 develops a resultant force $F_{R52}$ that is oriented generally perpendicular to the edge of a rotor pole surface, schematically shown by line 64, which is developed by the adjustable rotor pole shoes, such as rotor pole shoes 36, 38, 40 and 42, as previously described and shown by FIGURE 3. It can be seen from FIGURE 5 that the resultant force $F_{R52}$ has an axial force component $f_a$ that imparts a desired velocity to a conductive fluid being pumped. Helix angle 62 develops a resultant force $F_{R62}$ that is oriented to the edge of a rotor pole surface, schematically shown by line 66, as developed by the adjusted rotor pole shoes 36, 38, 40 and 42 as previously described and shown by FIGURE 4. Resultant force $F_{R62}$ has an axial force component $f_a$ that imparts a velocity to the conductive fluid that is less than the component $f_a$ developed by resultant force $F_{R52}$. Therefore, the improved helical rotor of the invention provides for the development of adjustable rotor pole surfaces that define variable helix angles, such as helix angles 52 and 62, so that a desired pumping force is obtained.

Referring now to FIGURE 6, another form of circumferentially adjustable rotor pole shoes 70 is attached to a rotor body member 72 by a cap screw 74. The cap screw 74 is positioned through a suitable channel 76 and a pole shoe slot 78 into a tapped hole 80 in the rotor body member 72. The head of the cap screw 74 seats against the bottom wall of channel 76 when the rotor pole shoe 70 is secured or clamped to the rotor body member 72 by the cap screw. This fastening means permits a reduced outer diameter for an assembled helical rotor, partly shown by FIGURE 6, similar to the helical rotor of FIGURE 2. It is contemplated that the rotor pole shoes, such as rotor pole shoe 36 of FIGURE 2 or rotor pole shoe 70 of FIGURE 6, may be positioned in suitable channels (not shown) formed in a rotor body member to further reduce the outer diameter of an assembled helical rotor.

The rotor pole shoe 70 shown by FIGURE 6 has a tenon portion 82 that slides within a suitable mortise 84 formed in the rotor body member 72. Rotor pole shoe 70 provides an improved magnetic flux path and, because of the tenon-and-mortise joint, further provides positive retention of the rotor pole shoe when the improved helical rotor is rotated during a pumping operation, particularly if cap screw 74 fails.

Operatively, the rotor pole shoe 70 of FIGURE 6 is circumferentially adjusted in a manner similar to that previously described for each of the rotor pole shoes as shown by FIGURES 2–4.

Referring now to FIGURE 7, another form of rotor pole shoe 88 is fastened to a rotor body member 90 by a radially extending rod 92 that passes through an arcuate slot 94 suitably formed in the rotor body member. Rod 92 is suitably connected to an adjustable means, such as control shaft 96 whose axis of rotation is generally perpendicular to the plane of the drawing. Operatively, the rotation of control shaft 96 a predetermined arcuate distance circumferentially adjusts rotor pole shoe 88 and changes the position of the portion of a rotor pole surface developed by rotor pole shoe 88.

Referring to FIGURE 8, rotor pole shoe 100 is functionally similar to the rotor pole shoes as shown by FIGURES 6 and 7. Rotor pole shoe 100 is fastened to a rotor body member 102 by a radially extending, threaded rod 104 that passes through an arcuate slot 106 suitably formed in the rotor body member. Rod 104 is threaded into a tapped hole 108 in rotor pole shoe 100. It is contemplated that rod 104 can be connected to an adjustable means, such as control shaft 96 as shown by FIGURE 7, or the like. It is also contemplated that rod 104 can be an internally positioned, outwardly directed fastening means, such as a cap screw similar to cap screw 74 as shown by FIGURE 6.

The form of rotor pole shoe 100 shown by FIGURE 8 has a tenon portion 110 that slides within a suitable mortise 112 in the rotor body member 102. Operatively, the rotor pole shoe 100 is circumferentially adjustable in a manner similar either to that described and shown by FIGURE 6, or to that described and shown by FIGURE 7.

Referring now to FIGURE 9, another form of improved helical rotor 120 is built-up from similar rotor laminations, such as rotor laminations 122, 124, and 126. The rotor laminations are stacked on a central spline shaft 128 having similar helical splines 130. Each of the rotor laminations 122, 124, and 126 has a suitably formed aperture 132 for sliding engagement with the spline shaft 128. As the helical rotor 120 is built-up from the stacked laminations, the rotor pole surfaces 134 and 136 are circumferentially skewed along the axial length of the rotor;

the skew or helix angle directly corresponding to the helix angle that the helical splines 130 define about the spline shaft 128.

Operatively, a predetermined helix angle is obtained with the improved helical rotor 120 of FIGURE 9 by the insertion of a spline shaft having the desired corresponding helix angle as defined by its helical splines through the stacked rotor laminations which results in the predetermined helix angle.

Referring to FIGURE 10, another form of improved helical rotor 140 is shown as a salient pole rotor having rotor pole surfaces 142 and 144. Helical rotor 140 has a rotor body member 146 secured to or integrally formed with a rotor shaft 148. A plurality of similar rotor pole shoes 150 are juxtaposed and are attached to the rotor body member 146 by similar cap screws 152 which pass through the rotor pole shoes into suitably spaced, similar tapped holes 154 in the rotor body member. The rotor pole shoes 150 are suitably formed from either a permanently magnetic material or a magnetic material such as silicon steel machined to a desired rotor contour or in relatively thin sheets having a degree of flexibility, or the like, so that the position of the rotor pole surfaces can be changed to define a desired helix angle.

The improved helical rotors described hereinbefore provide not only a variable helix angle but also a helix angle that can itself be varied, i.e. is not constant, as the rotor pole surfaces traverse the axial length of a helical rotor.

As will be evidenced from the foregoing description, certain aspects of the invention are not specifically limited to the particular details of construction as illustrated. It is contemplated that other modifications and applications will occur to those skilled in the art, and it is therefore intended that the appended claims shall cover such modifications and applications that do not depart from the true spirit and scope of the invention.

What is claimed is:

1. In a helical rotor electromagnetic pump for pumping fluids, an improved rotor comprising:
    (a) at least a first core member,
    (b) a plurality of adjustable rotor pole shoes cooperating with said core member,
    (c) selected ones of said rotor pole shoes suitably arranged in juxtaposition,
    (d) at least first and second rotor pole surfaces developed by said juxtaposed pole shoes,
    (e) said first and second pole surfaces defining a variable helix angle, and
    (f) adjustable means cooperating with said pole shoes so that the adjustment of selected ones of said pole shoes changes the position of said rotor pole surfaces and thereby defines a predetermined helix angle.

2. The improved rotor of claim 1 in which said rotor pole shoes are circumferentially adjustable.

3. The improved rotor of claim 2 in which said rotor pole shoes slidingly engage said core member.

4. The improved rotor of claim 1 in which said adjustable means is a removable screw means.

5. The improved rotor of claim 1 in which said selected ones of said rotor pole shoes are juxtaposed in axial alignment.

6. The improved rotor of claim 1 in which said helix angle is variable as said rotor pole surfaces progress axially.

7. The improved rotor of claim 1 in which said adjustable means is a rotatable shaft having radially extending portions suitably connected to selected ones of said rotor pole shoes.

8. The improved rotor of claim 1 in which said adjustable rotor pole shoes are flexible.

9. The improved rotor of claim 1 in which said core member is a rotor shaft.

10. The improved rotor of claim 9 in which said adjustable means is at least one helical spline which cooperates with said rotor shaft and said rotor pole shoes.

References Cited

UNITED STATES PATENTS 2,490,789 12/1949 Ellis _____ 310—105
2,940,393 6/1960 Baker _____ 310—11 X J. D. MILLER, *Primary Examiner.*

D. X. SLINEY, *Assistant Examiner.*